Figure 1:
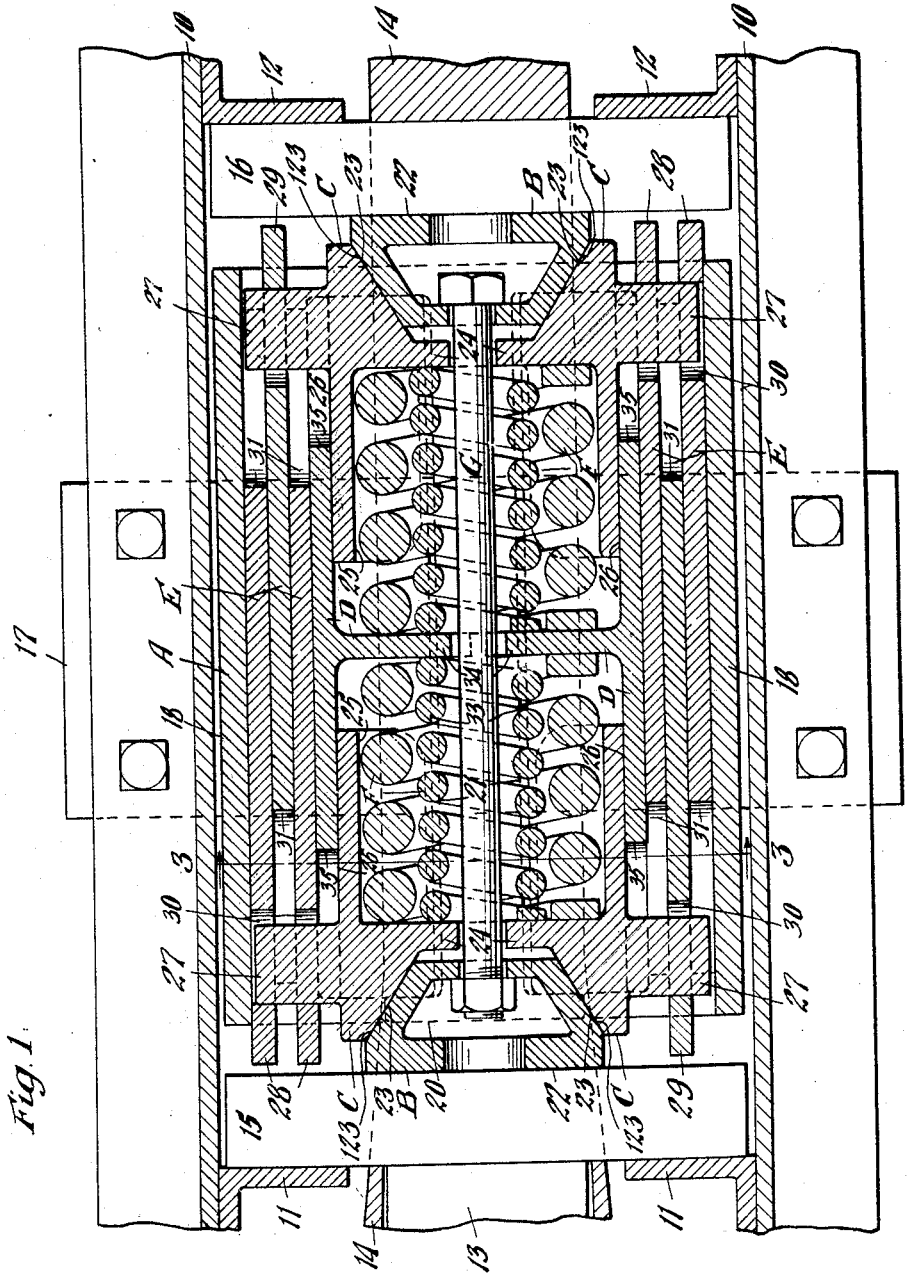

May 8, 1928.　　　　　　　　　　　　　　　1,668,900
S. B. HASELTINE
FRICTION SHOCK ABSORBING MECHANISM
Filed May 14, 1924　　　　2 Sheets-Sheet 1

Witnesses
Wm. Geiger

Inventor
Stacy B. Haseltine
By George I Haight
Atty.

May 8, 1928. 1,668,900
S. B. HASELTINE
FRICTION SHOCK ABSORBING MECHANISM
Filed May 14, 1924 2 Sheets-Sheet 2
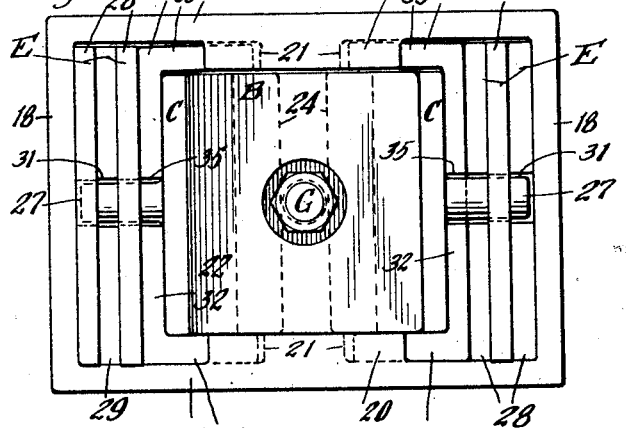
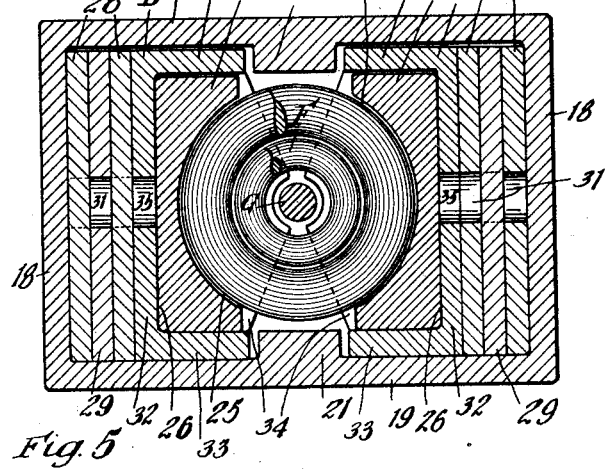
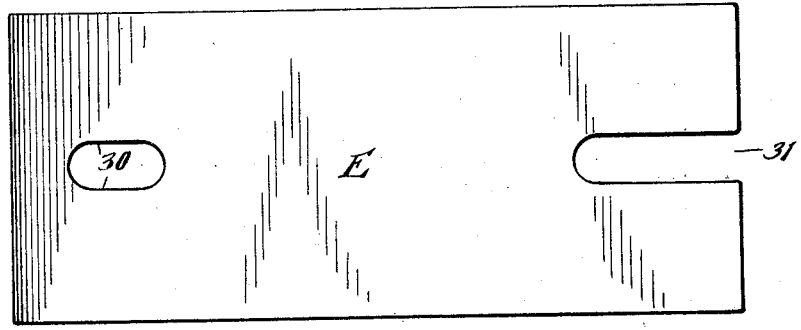
Witnesses
Wm. Geiger
Inventor
Stacy B. Haseltine
By George I. Haight
Atty.

Patented May 8, 1928.

1,668,900

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 14, 1924. Serial No. 713,140.

This invention relates to improvements in friction shock absorbing mechanisms.

One object of the invention is to provide a high capacity friction shock absorbing mechanism of the intercalated plate type, adapted for railway draft riggings, having a relatively light action during the initial portion and a heavier frictional resistance during the remainder of the compression stroke.

Another object of the invention is to provide a friction shock absorbing mechanism, including a plurality of intercalated friction elements and a coacting friction wedge system, together with means for restoring the friction elements to normal position after each compression stroke, so arranged that restoration of the friction elements is assured by effecting release of the friction wedge system prior to any relative movement of the intercalated friction elements.

A more specific object of the invention is to provide a mechanism of the character indicated, including a plurality of relatively movable coacting friction elements, wherein certain of said elements are provided with stiffening means thereby bracing the same and the remaining elements to prevent bending or other distortion thereof during the operation of the mechanism.

Other objects and advantages of the invention will more clearly appear from the description and claims hereinafter following.

In the drawings forming a part of this specification, Figure 1 is a longitudinal, horizontal sectional view of a portion of a railway draft rigging showing my improvements in connection therewith. Figure 2 is a front end elevational view of the shock absorbing mechanism proper. Figure 3 is a vertical, transverse, sectional view of the shock absorbing mechanism proper, corresponding substantially to the line 3—3 of Figure 1. Figure 4 is a detailed, perspective view of one of the wedge friction shoes used in connection with my improved mechanism. And Figure 5 is a detailed, side elevational view of one of the frictional plates of said mechanism.

In said drawings, 10—10 denote channel-shaped center or draft sills of a railway car underframe, to the inner faces of which are secured front stop lugs 11—11 and rear stop lugs 12—12. The inner end portion of the drawbar is indicated at 13, the same being operatively connected to a yoke 14 of well known form, within which are disposed the shock absorbing mechanism proper and front and rear followers 15 and 16. The yoke and parts therewithin are supported in operative position by a detachable saddle plate 17.

The improved shock absorbing mechanism proper, as shown, comprises broadly, a friction shell or casing A; front and rear wedge blocks B—B; front and rear pairs of wedge shoes C—C; two friction elements D—D; two groups of intercalated friction plates E—E; tandem arranged spring resistance elements F—F; and a retainer bolt G.

The friction shell or casing A is in the form of a rectangular box-like casting open at its opposite ends, and has spaced, longitudinally disposed side walls 18—18 and longitudinally disposed, spaced top and bottom walls 19—19, the interior surfaces of the side walls 18 presenting longitudinally extending friction surfaces adapted to coact with the outermost plates of the groups of friction plates E—E. As clearly shown in Figure 1, the shell A is of such a length that the front and rear ends thereof are normally spaced from the front and rear followers. At the front and rear ends of the top and bottom walls 19 of the shell are provided opposed, transversely extending, interior ribs 20, each rib being relatively short and having its opposite ends equally spaced from the respective side walls 18. Each of the walls 19 also has on the interior side a longitudinally disposed, relatively wide central rib 21 extending from the front to the rear end of the shell and merging with the corresponding front and rear ribs 20. The opposed top and bottom ribs 21 act to maintain the spring resistance elements F in position, the bottom rib further acting as a support for the springs. The transverse ribs 20 form front and rear abutments for the friction elements D, preventing longitudinal movement of the same with reference to the shell, and yet permitting lateral displacement thereof.

The front and rear wedge blocks are of like construction, each block being in the form of a hollow casting and having a flat outer face 22 adapted to abut the inner surface of the corresponding main follower. Each block is also provided with a pair of faces 23 at the opposite sides thereof, converging inwardly of the mechanism and adapted to coact with the adjacent pairs of friction wedge shoes C.

The friction wedge shoes C—C, which are four in number, are arranged in pairs at the opposite ends of the mechanism, each pair coacting with the corresponding wedge block B. On the inner side, that is, the side nearest the longitudinal central axis of the mechanism, each shoe has a wedge face 123 correspondingly inclined to and adapted to coact with the corresponding wedge face 23 of one of the blocks B. At the inner end of the wedge face 123, each block has a vertically disposed, laterally projecting flange 24 and inwardly of the flange the corresponding side of the body portion of the shoe is recessed as indicated at 25 to accommodate the adjacent side of the outer coil of the corresponding main spring resistance F. The outer side of each shoe is flat, presenting an elongated friction surface 26 adapted to coact with the corresponding friction element D. Adjacent the outer end, each shoe is provided with a laterally outwardly projecting lug 27 for a purpose hereinafter described.

As herein shown, two groups of friction plates E are employed, one group being disposed on each side of the mechanism. Each group is preferably composed of outer and inner plates 28 and an intermediate plate 29. The outer plate 28 of each group has frictional contact with the inner surface of the corresponding side wall 18 of the shell and the inner plate 28 of each group frictionally engages the corresponding element D. The plates 28 and 29 are of similar construction, and as best shown in Figure 5, each plate has adjacent one end a longitudinally, elongated opening 30 disposed midway of its height and spaced inwardly from the corresponding end edge thereof. At the opposite end, each plate has an inwardly extending longitudinal slot 31. The slot 31 is also disposed midway between the top and bottom edges of the plate and is of appreciably greater length than the opening 30. The plates 28 and 29 of each group are reversely arranged, the plates 28 of one group having the openings 30 at the forward end and the plate 29 of the same group having the opening 30 at the rear end. The elongated openings 30 and the slots 31 of the plates 28 of the aforementioned group are adapted to slidingly receive the laterally projecting lugs 27 of the corresponding front and rear shoes C, respectively, and the elongated openings 30 and slots 31 of the plates 29 of said group are respectively adapted to slidingly receive the lugs 27 of the corresponding rear and front shoes C. On the opposite side of the device, the arrangement of plates, slots and openings is directly reversed. As clearly shown in the drawings, the slots 30 of the plates 28 and 29 are of such a length as to permit a certain amount of lost motion between the plates and shoes to which they are connected by the lugs 27, the lugs 27 normally engaging the outer end walls of said openings, maintaining the outer ends of the plates 28 and 29, respectively, slightly spaced from the front and rear followers and projecting beyond the corresponding ends of the shell. As will be evident, the lugs 27 serve to move the respective plates outwardly during the release of the mechanism to restore them to normal position. The respective slots 31 of the plates 28 and 29 which accommodate the lugs 27 of the rear and front shoes are of such a length as to permit full movement of the plates during compression of the mechanism.

The two friction elements D are of like construction, each being in the form of a channel shaped elongated member having a vertical, longitudinally disposed wall 32 and lateral, inwardly projecting, horizontal top and bottom stiffening flanges 33. Each element D has a transversely disposed, vertical web 34 formed integral therewith midway between the ends thereof. The elements D are disposed on opposite sides of the longitudinal center of the mechanism, each being interposed between one of the groups of plates E and the corresponding front and rear shoes, the flat outer faces 26 of the shoes bearing on the inner surface of the wall 32 and the innermost plate 28 of said group bearing on the outer surface of said wall. The top and bottom plates, in addition to serving as stiffening members for the elements D, by means of which the lateral pressures induced by the wedging-systems are distributed throughout the length of the plate E, act as top and bottom guides for the shoes C. When the parts are assembled, the webs 34 are substantially in transverse alinement and serve as abutment means for the inner ends of the inner and outer coils of the respective spring resistance elements F, the spring resistance elements F being arranged in tandem as shown, one having its front end engaging the flanges 24 of the front set of shoes and the other having its rear end engaging the flanges 24 of the rear set of shoes. The front and rear ends of the wall 32 of each element are centrally slotted as indicated at 35 to slidingly accommodate the lugs 27 of the corresponding front and rear shoes. Each slot 35 extends inwardly from the end edge of the plate and is of such a length as to permit the necessary inward movement of the lugs 27 of the corresponding shoe to assure the required full movement of the shoe during compression of the mechanism.

It will be evident that the tandem springs bearing on opposite sides of the webs 34 of the elements D serve to maintain the same and consequently the shell A properly centered, the elements D being confined between the ribs 20 of the shell, as hereinbefore pointed out.

The parts of the shock absorbing mechanism are held in assembled relation and the mechanism maintained at the proper overall length by the retainer bolt G extending through the inner coils of the tandem springs F and having its front and rear ends anchored in the recesses of the hollow front and rear wedges respectively, the webs 34 being notched to accommodate the sides of the retainer bolt. The bolt G also serves to hold the mechanism under initial compression. As wear occurs on the various friction and wedge faces, compensation therefor will be had by the expansion of the spring elements F which are free to expand as hereinbefore pointed out, moving the wedge shoes outwardly.

The operation of the mechanism is as follows: Assuming an inward or buffing movement of the drawbar, the front follower 15 will be moved rearwardly, compressing the tandem spring resistance elements F, and thereby forcing the rear pair of wedge shoes C into tight wedging engagement with the rear wedge B, which is held stationary by engagement with the follower 16. At the same time, a wedging action will be set up between the front and rear wedges and shoes, placing the friction plates under lateral pressure. As the rearward movement of the follower 15 continues, the front set of shoes will slide on the friction elements D and, at the same time and due to the friction between the parts, tending to force the friction elements D together with the shell and friction plates rearwardly, thereby effecting a relative substantially similar sliding movement of the elements D on the rear set of shoes C. During this action, the lugs on the front and rear shoes will become spaced from the outer end walls of the recesses 30 of the plates, the front follower 15 will approach the forward ends of the plates 28 and 29 projecting from the forward end of the shell and the plates 28 and 29 projecting from the opposite end of the shell will approach the rear follower 16. This action will continue until the front and rear followers engage the nearest adjacent plates 28 and 29, whereupon the plates will be moved relatively to each other, greatly augmenting the frictional resistance offered. The described movement of the followers, plates and shell continues until the actuating force is removed, or until the front and rear ends of the shell A abut the front and rear followers whereupon the force is transmitted directly through the shell and followers to the rear stop lugs, thereby preventing the springs from being driven solid.

During draft, the action is substantially the reverse of that just described, the front follower 15 remaining stationary while the rear follower is moved toward the same. Upon reduction of the actuating force, the wedging pressure will be relieved due to the relatively blunt angle included between the faces 23 of each wedge and there will be an initial release movement of the friction shoes and wedges due to the lugs on the shoes being spaced inwardly of the outer end walls of the recesses 30 of the plates E during compression of the mechanism. The only resistance which must be overcome at this time, therefore, is the very slight friction between the shoes and the elements D. A certain reduction of the lateral pressure on the groups of friction plates, and, therefore, an easy and quick release, is thus assured. As either set of shoes, at the front or rear end of the mechanism moves outwardly relatively to the shell, due to the expansive action of the springs F, the lugs 27 on the said set of shoes will come into engagement with the outer end walls of the openings 30 of the corresponding plates and carry the plates outwardly therewith. On account of the friction existing between the plates of each group, the remaining plates of the two groups will be carried forward also until they are arrested by the outer end walls of the slots 30 thereof coming into abutment with the lugs 27 of the other set of shoes. At the same time, the tandem springs acting on the webs 34 of the friction elements D will restore the latter and the shell to centered position.

I have herein shown and described what I now consider the preferred manner of carrying out my invention but the same is merely illustrative and I contemplate all changes and modifications that come within the scope of the claims appended hereto.

I claim:

1. In a friction shock absorbing mechanism, the combination with a group of intercalated, relatively movable friction plates; of means for effecting relative movement of said plates; a friction element coacting with said plates, said element being braced by longitudinally disposed stiffening flanges; and means for compressing said group of plates laterally, including a lateral pressure-creating means disposed at one side of said group of plates and a lateral pressure-resisting member having an abutment surface disposed at the opposite side of said group of plates, said member having means rigid therewith engaging said element to prevent longitudinal movement therebetween; and a spring resistance coacting with said lateral pressure-creating means.

2. In a friction shock absorbing mechanism, the combination with front and rear followers, said followers being movable toward and away from each other; of a friction shell interposed between said followers; a pair of longitudinally disposed, laterally displaceable friction elements at opposite sides of the longitudinal axis of the mechanism, each of said elements having abutment means thereon; means for holding said elements against movement longitudinally of the shell; wedge pressure-transmitting means at opposite ends of said mechanism and coacting with said friction elements; tandem arranged springs between said elements cooperating with the wedge pressure-transmitting means and engaging said abutments to center the friction elements and shell; and a group of intercalated friction plates interposed between each friction element and the corresponding side of the shell, said plates being adapted to be engaged by said followers, and moved relatively to each other.

In witness that I claim the foregoing I have hereunto subscribed my name this 12th day of May 1924.

STACY B. HASELTINE.